United States Patent [19]
Alvstad et al.

[11] Patent Number: 5,651,001
[45] Date of Patent: Jul. 22, 1997

[54] METHOD AND APPARATUS FOR FULL DUPLEX SIGNALING

[75] Inventors: Gary A. Alvstad; Jie Ni, both of Beaverton, Oreg.

[73] Assignee: Intel Corporation, Santa Clara, Calif.

[21] Appl. No.: 363,616

[22] Filed: Dec. 22, 1994

[51] Int. Cl.⁶ ...................................................... H04B 1/56
[52] U.S. Cl. ........................... 370/276; 370/226; 370/279; 370/285; 375/288
[58] Field of Search ................... 370/24, 26, 27, 370/28, 37, 118, 16, 94.3, 85.9, 276, 279, 284, 285, 477, 217, 221, 225, 364; 375/286, 287, 288, 240, 242

[56] References Cited

U.S. PATENT DOCUMENTS

| | | | |
|---|---|---|---|
| 3,927,401 | 12/1975 | McIntosh | 375/286 |
| 4,377,858 | 3/1983 | Treiber | 370/24 |
| 4,451,916 | 5/1984 | Casper et al. | 370/16 |
| 4,475,212 | 10/1984 | McLean et al. | 375/286 |
| 4,860,309 | 8/1989 | Costello | 375/286 |
| 5,119,402 | 6/1992 | Ginzburg et al. | 375/288 |
| 5,438,571 | 8/1995 | Albrecht et al. | 370/94.3 |

*Primary Examiner*—Douglas W. Olms
*Assistant Examiner*—Shick Hom
*Attorney, Agent, or Firm*—Blakely, Sokoloff, Taylor & Zafman

[57] ABSTRACT

A network transmitter device and network receiver device is described. The network transmitter device transmits a first voltage potential, a second voltage potential, a third voltage potential and a fourth voltage potential over a first pair of output lines and a second pair of output lines in response to digital signals received over a data input. The network receiver device receives network signals of a first voltage potential, a second voltage potential, a third voltage potential, a fourth voltage potential and a fifth voltage potential over a first pair of output lines and a second pair of output lines. The network receiver device transmits digital signals corresponding to the network signals.

12 Claims, 8 Drawing Sheets

METHOD AND APPARATUS FOR FULL DUPLEX SIGNALING

FIELD OF THE INVENTION

The present invention relates to the field of network devices. More particularly, the present invention relates to network transmitter devices and network receiver devices.

BACKGROUND OF THE INVENTION

In a network of computer systems, network transmitter devices and network receiver devices are required to allow individual computer systems to communicate with other computer systems. The network transmitter devices and network receiver devices can reside in an individual computer system to allow the computer system to communicate with other computer systems in the network. In addition, the network transmitter devices and network receiver devices can reside in repeater devices, bridge devices, router devices and hub devices allowing individual computer systems of one network to communicate with individual computer systems of another network.

In the network configurations described above, application programs can be stored in one computer system and accessed by other computer systems through the network by using the network transmitter devices and network receiver devices. In addition, data files can be stored in one computer system and accessed by other computer systems through the network by using the network transmitter devices and network receiver devices. Moreover, data, audio and video information can be transmitted from one computer system to another computer system through the network by using the network transmitter devices and network receiver devices. Because the network transmitter devices and network receiver devices perform the communication functions of the network, the performance capabilities of the network transmitter devices and network receiver devices is a major determining factor for the performance capabilities of the network as a whole.

One prior network transmitter device and network receiver device operated over four pairs of twisted wires. The network transmitter device of an individual computer system transmitted signals over three pairs of the four pairs of twisted wires. The network receiver device of the computer system also received signals over three pairs of the four pairs of twisted wires. However, only two pairs of the three pairs is common to both the network transmitter device and the network receiver device. One pair is dedicated to the network transmitter device for transmitting network signals and another pair is dedicated to the network receiver device for receiving network signals. A computer system using the prior network transmitter device and the prior network receiver device can transmit or receive data at the rate of 100 megabits per second. However, as described above, the prior network transmitter device and the prior network receiver device uses two pairs of twisted wires that is common to both the network transmitter device and the network receiver device. Thus, the computer system using the prior network transmitter device and prior network receiver device can only transmit or receive over the network at any given point in time. The computer system cannot both transmit and receive at the same time. In effect, a computer system utilizing the prior network transmitter device and prior network receiver device can only operate in the half duplex mode. This limitation acts to decrease the performance capability of the network.

In addition, because the prior network transmitter device and the prior network receiver device use two pairs of twisted wires that is common to both the network transmitter device and the network receiver device, a computer system utilizing the prior devices needs network arbitration of access between network transmitter devices of different computer systems or experience losses due to collisions. This effect also acts to decrease the performance capability of the network.

Thus, what is needed is a network transmitter device and a network receiver device that allows for enhanced performance of the network.

SUMMARY OF THE INVENTION

A novel network transmitter device and network receiver device is described. The network transmitter device comprises a data input for receiving digital signals, a first pair of output lines, a second pair of output lines, and a converter coupled to the data input for transmitting a first voltage potential, a second voltage potential, a third voltage potential and a fourth voltage potential over the first pair of output lines and the second pair of output lines in response to the digital signals received over the data input.

Under an alternative embodiment, the network transmitter device can also transmit a fifth voltage potential over the first pair of output lines and the second pair of output lines in response to digital signals received over the data input.

Under another alternative embodiment, the network transmitter device comprises a data input for receiving digital signals, a converter coupled to the data input for transmitting the network signals of a first voltage potential, a second voltage potential, a third voltage potential, a fourth voltage potential and a fifth voltage potential over the network in response to the digital signals received over the data input, and an encoder coupled to the converter and the data input for inserting a fifth voltage potential when the network transmitter receives a sequence of the digital signals corresponding to three network signals of a same voltage potential.

Under yet another alternative embodiment, the network transmitter device transmits a first network signal of a fifth voltage potential, a second network signal, and a third network signal of a fifth voltage potential when the transmitter device receives a sequence of the digital signals corresponding to three network signals of a same voltage potential.

The network receiver device comprises a data output for transmitting digital signals, a first pair of input lines, a second pair of input lines, and a converter coupled to the first pair of input lines, the second pair of input lines and the data output for receiving network signals of a first voltage potential, a second voltage potential, a third voltage potential, a fourth voltage potential and a fifth voltage potential over the first pair of output lines and the second pair of output lines and for transmitting the digital signals corresponding to the network signals.

Under an alternative embodiment, the network receiver device further comprises a decoder coupled to the converter for transmitting a sequence of the digital signals corresponding to three network signals of a same voltage potential when the receiver device receives a first network signal of a fifth voltage potential, a second network signal, and a third network signal of a fifth voltage potential.

A method for transmitting signals in a network is also described. The method comprises receiving digital signals, converting a first plurality of the digital signals to network signals of a first voltage potential, a second voltage potential, a third voltage potential, and a fourth voltage potential, transmitting a first plurality of the network signals over a first pair network lines, and transmitting a second plurality of said network signals over a second pair of network lines.

Under an alternative embodiment, the method comprises receiving digital signals, converting a first plurality of the digital signals to a network signal of a first voltage potential, converting a second plurality of the digital signals to a network signal of a second voltage potential, converting a third plurality of the digital signals to a network signal of a third voltage potential, converting a fourth plurality of the digital signals to a network signal of a fourth voltage potential, and converting a fifth plurality of the digital signals to a network signal of a fifth voltage potential.

A method for receiving signals in a network is also described. The method comprises receiving a network signal of a first voltage potential from the network, converting the network signal of a first voltage potential to a first plurality of digital signals corresponding to the network signal of a first voltage potential, transmitting the first plurality of digital signals to a computer system, receiving a network signal of a second voltage potential from the network, converting the network signal of a second voltage potential to a second plurality of digital signals corresponding to the network signal of a second voltage potential, transmitting the second plurality of digital signals to the computer system, receiving a network signal of a third voltage potential from the network, converting the network signal of a third voltage potential to a third plurality of digital signals corresponding to the network signal of a third voltage potential, transmitting the third plurality of digital signals to the computer system, receiving a network signal of a fourth voltage potential from the network, converting the network signal of a fourth voltage potential to a fourth plurality of digital signals corresponding to the network signal of a fourth voltage potential, transmitting the fourth plurality of digital signals to the computer system, receiving a first network signal of a fifth voltage potential from the network, converting the first network signal of a fifth voltage potential to a fifth plurality of digital signals corresponding to the first network signal of a fifth voltage potential, and transmitting the fifth plurality of digital signals to the computer system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel network transmitter device and network receiver device is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantifies. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
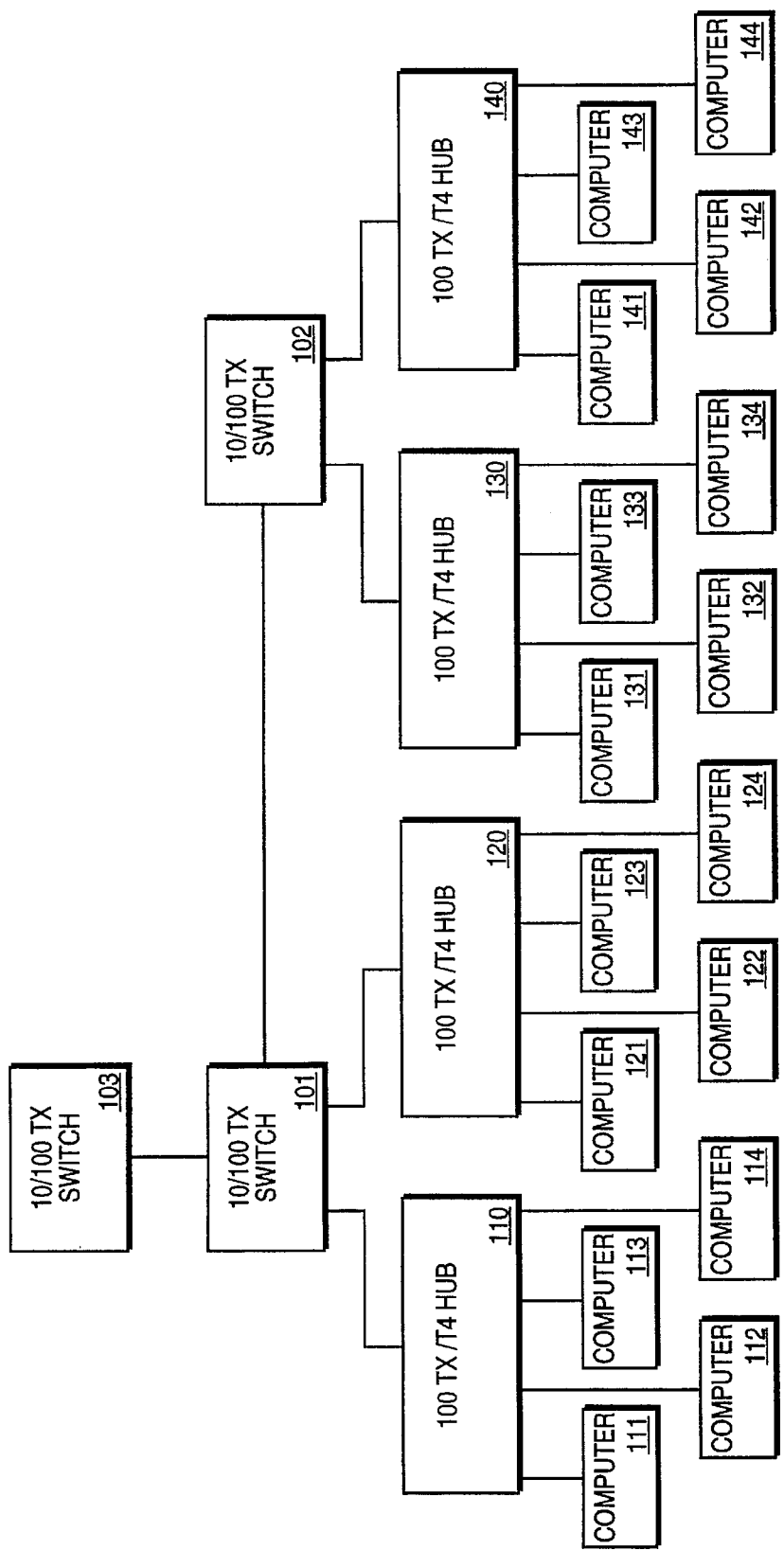
FIG. 1 illustrates in block diagram form a network of one embodiment of the present invention.

FIG. 1 illustrates in block diagram form a network of one embodiment of the present invention. Network 100 comprises switch 101, switch 102 and switch 103. Network 100 also comprises hub 110, hub 120, hub 130 and hub 140. In addition, network 100 comprises computer system 111, computer system 112, computer system 113, computer system 114, computer system 121, computer system 122, computer system 123, computer system 124, computer system 131, computer system 132, computer system 133, computer system 134, computer system 141, computer system 142, computer system 143 and computer system 144. Switch 101 is coupled to switch 102 and is also coupled to switch 103. Switch 101, switch 102 and switch 103 can be a 10/100 TX switch or can be other appropriate switches. Switch 101 allows computer systems of hub 110 (e.g. computer system 111, computer system 112, computer system 113 or computer 114) to transmit and receive information from computer systems of hub 120 (e.g. computer system 121, computer system 122, computer system 123 and computer system 124). Similarly, switch 101 allows a computer system of hub 120 to transmit and receive information from a computer system of hub 110. In addition, switch 101 in conjunction with switch 102 allows a computer system of hub 110 to transmit and receive information from a computer system of hub 130 (e.g. computer system 131, computer system 132, computer system 133 and computer system 134) or a computer system of hub 140 (e.g. computer system 141, computer system 142, computer system 143 or computer system 144). Similarly, switch 101 in conjunction with switch 102 allows a computer system of hub 120 to transmit and receive signals from a computer system of hub 130 or a computer system of hub 140. Switch 102 and switch 103 operate similarly to switch 101.

Hub 110 is coupled to switch 101 and is also coupled to computer system 111, computer system 112, computer system 113 and computer system 114. Hub 120 is coupled to switch 101 and is also coupled to computer system 121, computer system 122, computer system 123 and computer system 124. Hub 130 is coupled to switch 102 and is also coupled to computer system 131, computer system 132, computer system 133 and computer system 134. Hub 140 is coupled to switch 102 and is also coupled to computer system 141, computer system 142, computer system 143 and computer system 144. Hub 110 allows computer system 111, computer system 112, computer system 113 and computer system 114 to transmit and receive information between each other. In addition, hub 110 allows computer system 111, computer system 112, computer system 113 and computer system 114 to transmit and receive information from other computer systems through switches (e.g. switch 101 and switch 102) and other hubs (e.g. hub 120, hub 130 or hub 140). Hub 120, hub 130 and hub 140 operate similarly to hub 110.

In this embodiment, computer system 111, computer system 112, computer system 113, computer system 114, computer system 121, computer system 122, computer system 123, computer system 124, computer system 131, computer system 132, computer system 133, computer system 134, computer system 141, computer system 142, computer system 143 or computer system 144 can comprise a network transmitter device which is operable to transmit a first voltage potential, a second voltage potential, a third voltage potential and a fourth voltage potential over a first pair of output lines and a second pair of output lines in response to digital signals received by the network transmitter device. Alternatively, the computer systems can comprise a network transmitter device which is operable to transmit a network signal of a first voltage potential, a network signal of a second voltage potential, a network signal of a third voltage potential, a network signal of a fourth voltage potential and a network signal of a fifth voltage potential in response to digital signals received by the computer system. The computer systems can also comprise a network receiver device which is operable to receive network signals of a first voltage potential, a second voltage potential, a third voltage potential, a fourth voltage potential and a fifth voltage potential and is operable to transmit digital signals corresponding to the network signals.

Figure 2:
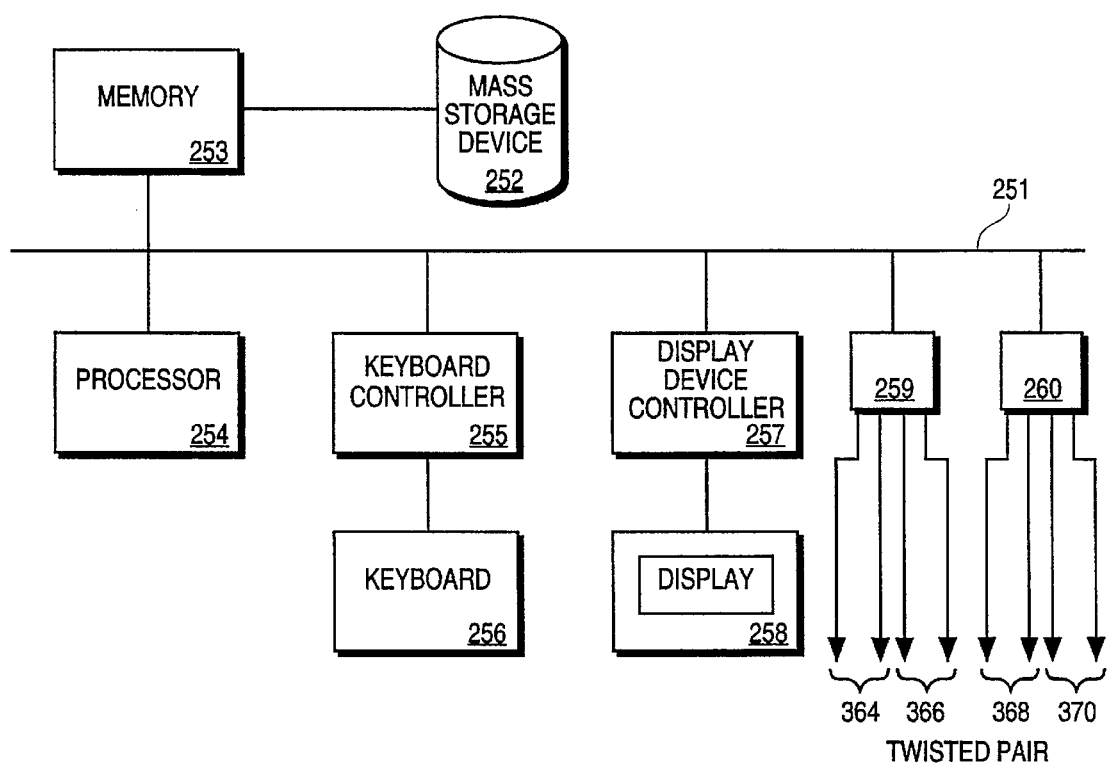
FIG. 2 illustrates in block diagram form a computer system of a second embodiment of the present invention.

FIG. 2 illustrates in block diagram form a computer system of a second embodiment of the present invention. Computer system 111 can be an implementation of a computer system of FIG. 1. Computer system 250 comprises bus 251, mass storage device 252, memory 253, processor 254, keyboard controller 255, keyboard 256, display device controller 257, display device 258, network transmitter device 259 and network receiver device 260. Mass storage device 252 is coupled to memory 253 and memory 253 is coupled to bus 251. Processor 254 and keyboard controller 255 are coupled to bus 251. Keyboard 256 is coupled to keyboard controller 255. Display device controller 257 is coupled to bus 251 and display device 258 is coupled to display device controller 257. Network transmitter device 259 and network receiver device 260 are coupled to bus 251.

Mass storage device 252 can be a floppy disk drive, hard disk drive, CD-ROM drive, flash memory device or other mass storage device. Mass storage device 252 can store application programs, operating system programs or other computer programs. Mass storage device 252 can also store data, audio information, video information or other information. The computer programs and information stored in mass storage device 252 can be transferred to memory 253.

Memory 253 can be a dynamic random access memory (DRAM), static random access memory (SRAM), cache memory or other memory device. Memory 253 can store application programs, operating system programs or other computer programs. Memory 253 can also store data, audio information, video information or other information. Memory 253 can transfer code that make up application programs, operating system programs or other computer programs to processor 254. Memory 253 can also transfer data, audio information, video information or other information to processor 254.

Processor 254 can be a complex instruction set computing (CISC) microprocessor, reduced instruction set computing (RISC) microprocessor or other processor device. Processor 254 executes code stored in memory 253 and performs operations on data, audio information, video information or other information stored in memory 253.

Keyboard controller 255 acts as an interface between processor 254 and keyboard 256. Keyboard controller 255 thus allows the coupling of keyboard 256 to computer system 111.

Display device controller 257 can be a monochrome display adapter (MDA), color graphics adapter (CGA), enhanced graphics adapter (EGA) or other display device controller. Display device controller 257 acts as an interface between computer system 250 and display device 258. Display device controller 257 thus allows the coupling of display device 258 to computer system 111. Display device 258 can be a computer monitor, flat panel display, television or other display device.

Network transmitter device 259 is coupled to a network by a first pair of network lines 364 and a second pair of network lines 366 which are both differential signal pairs. Network transmitter device 259 receives digital signals from processor 254 over bus 251. Network transmitter device 259 converts a first plurality of the digital signals to network signals of a first voltage potential, a second voltage potential, a third voltage potential, and a fourth voltage potential. Network transmitter device 259 transmits some of the network signals over the first pair of network lines and transmits some of the network signals over the second pair of network lines to the network. Network transmitter device 259 also converts some of the digital signals received over bus 251 to a network signal of a fifth voltage potential.

By converting digital signals to network signals of a first voltage potential, a second voltage potential, a third voltage potential, and a fourth voltage potential, network transmitter device 259 can transmit the equivalent of two bits of information at a time over a pair of network lines. Since network transmitter device 259 is coupled to two pairs of network lines (a first pair of network lines and a second pair of network lines) and transmits over the two pairs of network lines at the same time, network transmitter device 259 can transmit the equivalent of four bits of information at a time over the two pairs of network lines. Thus, when using a carrier frequency of 25 megahertz, network transmitter device 259 can transmit the equivalent of 100 megabits per second over the two pairs of network lines.

Network receiver device 260 is coupled to the network by a third pair of network lines 368 and a fourth pair of network lines 370 which are both differential signal pairs. Network receiver device 260 receives network signals of a first voltage potential, a second voltage potential, a third voltage potential, and a fourth voltage potential from the network over the third pair of network lines and the fourth pair of network lines. Network receiver device 260 converts the network signal of a first voltage potential to a first plurality of digital signals corresponding to the network signal of the first voltage potential, converts the network signal of a second voltage potential to a second plurality of digital signals corresponding to the network signal of the second voltage potential, converts the third network signal of a third voltage potential to a third plurality of digital signals corresponding to the network signal of the third voltage potential, and converts the network signal of a fourth voltage potential to a fourth plurality of digital signals corresponding to the network signal of the fourth voltage potential. The digital signals are transmitted by network receiver device 260 over bus 251 to processor 254. Network receiver device 260 also receives network signals of a fifth voltage potential and converts the network signals of the fifth voltage potential to a fifth plurality of digital signals corresponding to the network signal of the fifth voltage potential.

By receiving network signals of a first voltage potential, a second voltage potential, a third voltage potential, and a fourth voltage potential and converting the network signals to digital signals, network receiver device 260 can receive the equivalent of two bits of information at a time over a pair of network lines. Since network receiver device 260 is coupled to two pairs of network lines (a third pair of network lines and a fourth pair of network lines) and receives over the two pairs of network lines at the same time, network receiver device 260 can receive the equivalent of four bits of information at a time over the two pairs of network lines. Thus, when using a carrier frequency of 25 megahertz, network receiver device 260 can receive the equivalent of 100 megabits per second over the two pairs of network lines.

It will be appreciated that network transmitter device 259 and network receiver device 260 can be incorporated together into a single transceiver device which both transmits and receives network signals.

In this embodiment, network transmitter device 259 transmits network signals over a first pair of network lines and a second pair of network lines. Network receiver device 260 receives network signals over a third pair of network lines and a fourth pair of network lines. Thus, network transmitter device 259 transmits over one set of network lines and network receiver device 260 receives over another set of network lines. Network transmitter device 259 and network receiver device 260 in an individual computer system do not share network lines. Consequently, network transmitter device 259 and network receiver device 260 can operate simultaneously allowing operation in a full duplex mode. The full duplex capabilities in turn allow for enhanced performance of the network. Full duplex operation can lead to enhanced performance when compared to half duplex operation because full duplex operation avoids the wait periods associated with half duplex operation.

By utilizing separate pairs of network lines, network transmitter device 259 and network receiver device 260 also avoids collisions between outgoing network signals transmitted by network transmitter device 259 and incoming network signals received by network receiver device 260. In avoiding collisions, network transmitter device 259 and network receiver device 260 also avoids the retransmission of network signals associated with collisions. In this manner, network performance is also enhanced.

Figure 3:
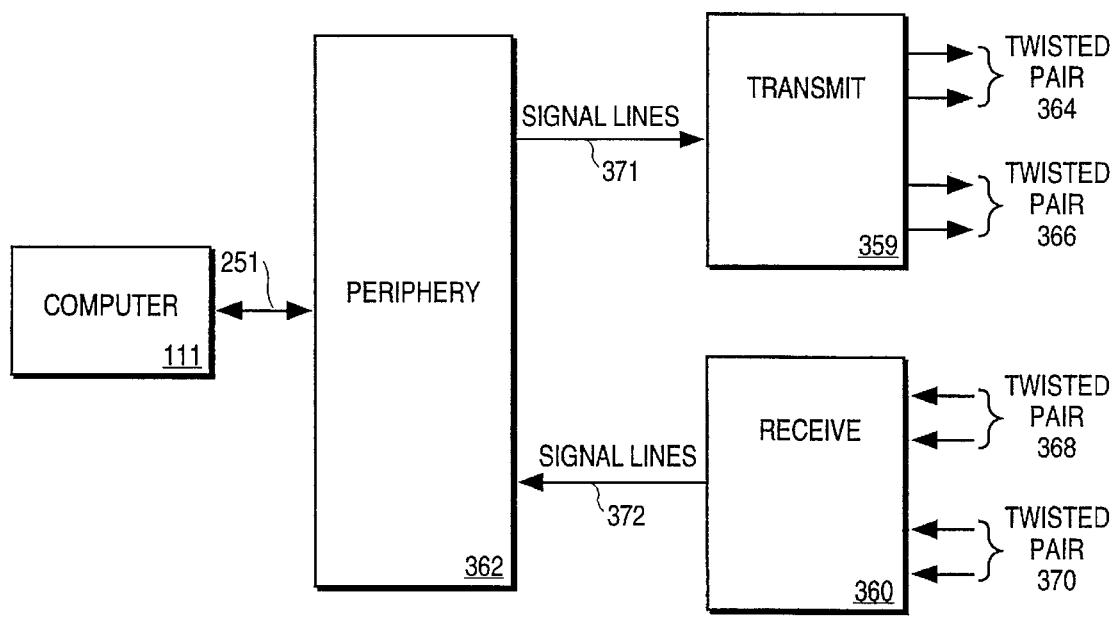
FIG. 3 illustrates in block diagram form a network transceiver device of a third embodiment of the present invention.

FIG. 3 illustrates in block diagram form a network transceiver device of a third embodiment of the present invention. Network transceiver device 361 can be an implementation of the network transmitter device and network receiver device of FIG. 2. Network transceiver device 361 comprises network transmitter device 359, network receiver device 360 and periphery device 362. Network transmitter device 359 is coupled to a network by a first pair of network lines 364 and a second pair of network lines 366. Network transmitter device 359 is also coupled to periphery device 362 by signal lines 371. Network receiver device 360 is coupled to the network by a third pair of network lines 368 and a fourth pair of network lines 370. Network receiver device 360 is also coupled to periphery device 362 by signal lines 372.

Periphery device 362 acts as a buffer between the computer system 111 and network transmitter device 359. Periphery device 362 also acts as a buffer between the computer system 111 and network receiver device 360. Periphery device 362 receives data and information from the computer system in the form of digital signals four bits at a time over bus 251. Periphery device 362 also receives control signals from the computer system 111. One of the control signals can be a transmit enable signal. The transmit enable signal is asserted by the computer system to network transmitter 359 to indicate upcoming data signals to be transmitted and to initiate transmission of network signals by network transmitter device 359. Another control signal can be a transmit error signal. The transmit error signal is asserted by the computer system to network transmitter device 359 to indicate transmission error and to discontinue the transmission by network transmitter device 359. Periphery device 362 transmits the digital signals and the control signals to network transmitter device 359.

Periphery device 362 also receives data and information from network receiver device 360 in the form of digital signals four bits at a time. Along with the digital signals from network receiver device 360, periphery device 362 receives control signals from network receiver device 360. One control signal can be a carry-send signal. The carry-send signal is asserted when network receiver device 360 detects energy on the network lines. Thus, the carry-send signal acts as an early warning to the computer system that a transmission may be coming from the network. A second control signal can be a collision signal. The collision signal indicates a collision between a transmission going out over the network lines and a transmission coming in over the network lines. In this embodiment, transceiver 361 comprises network transmitter device 359 which is coupled to one set of network lines and network receiver device 360 which is coupled to another set of network lines. Network transmitter device 359 and network receiver device 360 can operate simultaneously allowing transceiver 361 to operate in a full duplex mode. Consequently, a collision will not occur and network receiver device 360 does not assert the collision signal. A third control signal can be a data valid signal. The data valid signal indicates when valid data or information is being transmitted to periphery device 362. A fourth control signal can be a congestion signal. The congestion signal indicates a congestion in the network and causes the computer system to cease the transmission of network signals to the network. A fifth control signal can be a clock signal. The clock signal is used by periphery device 362 and the computer system to retrieve the data signals from network receiver device 360. Periphery device 362 transmits the digital signals containing data and other information to the computer system. Periphery device 362 also transmits the control signals to the computer system.

Network transmitter device 359 receives the digital signals containing data and other information from periphery device 362. Network transmitter device 359 converts the digital signals to network signals of a first voltage potential, a second voltage potential, a third voltage potential and a fourth voltage potential. Network transmitter device 359 transmits some of the digital signals over the first pair of network lines and transmits other network signals over the second pair of network lines. Network transmitter device 359 can also convert some of the digital signals to a network signal of a fifth voltage potential. The network signal of a fifth voltage potential can be transmitted over the first pair of network lines or the second pair of network lines. In addition, network transmitter device 359 converts the control signals which are in the form of digital signals to network signals of a first voltage potential, a second voltage potential, a third voltage potential or a fourth voltage potential. Network transmitter device 359 can also convert the control signals to a network signal of a fifth voltage potential. The control signals in the form of network signals can be transmitted over the first pair of network lines or the second pair of network lines by network transmitter 359.

Network receiver device 360 receives network signals of a first voltage potential, a second voltage potential, a third voltage potential and a fourth voltage potential over the third pair of network lines and the fourth pair of network lines. Network receiver device 360 converts the network signal to digital signals containing data and other information. Network receiver device 360 transmits the digital signals to periphery device 362. Network receiver device 360 also converts some of the network signals to digital control signals. The digital control signals can be a carry-send signal, a collision signal, a data valid signal, a congestion signal, a clock signal or an error signal. Network receiver device 360 transmits the digital control signal to periphery device 362. In addition, network receiver device 360 can receive network signals of a fifth voltage potential. The network signal of a fifth voltage potential can be converted to digital signals containing data or other information which are transmitted by network receiver device 360 to periphery device 362. Alternatively, the network signal of a fifth voltage potential can be converted by network receiver device 360 to one or more of the digital control signals described above.

Network transmitter device 359 can convert digital signals to network signals of a first voltage potential, a second voltage potential, a third voltage potential and a fourth voltage potential in accordance with Table 1. Network receiver device 360 can also convert network signals of a first voltage potential, a second voltage potential, a third voltage potential and a fourth voltage potential to digital signals in accordance with Table 1.

TABLE 1

| DIGITAL SIGNALS | NETWORK SIGNAL | VOLTAGE POTENTIAL |
|---|---|---|
| 00 | K | 2 volts |
| 01 | L | 1 volt |
| 10 | M | −1 volt |
| 11 | N | −2 volts |

As indicated in Table 1, the network signal of a first voltage potential can be labeled as "K," the network signal of a second voltage potential can be labeled as "L," the network signal of a third voltage potential can be labeled as "M," and the network signal of a fourth voltage potential can be labeled as "N." In this embodiment, the first voltage potential is 2 volts, the second voltage potential is 1 volt, the third voltage potential is −1 volt, and the fourth voltage potential is −2 volts. Other voltage levels can also be used in other embodiments. As shown in Table 1, the network signal of a first voltage potential (e.g. 2 volts) corresponds to digital signals comprising a logical-zero followed by a logical-zero. The network signal of a second voltage potential (e.g. 1 volt) corresponds to digital signals comprising a logical-zero followed by a logical-one. The network signal of a third voltage potential (e.g. −1 volt) corresponds to digital signals comprising a logical-one followed by a logical-zero. The network signal of a fourth voltage potential (e.g. −2 volts) corresponds to digital signals comprising a logical-one followed by a logical-one. Thus, when network transmitter device 359 receives digital signals of a logical-zero followed by a logical-zero, network transmitter device 359 converts the digital signals to a network signal of a first voltage potential. When network transmitter device 359 receives digital signals of a logical-zero followed by a logical-one, network transmitter device 359 converts the digital signals to a network signal of a second voltage potential. When network transmitter device 359 receives digital signals of a logical-one followed by a logical-zero, network transmitter device 359 converts the digital signals to a network signal of a third voltage potential. When network transmitter device 359 receives digital signals of a logical-one followed by a logical-one, network transmitter device 359 converts the digital signals to a network signal of a fourth voltage potential.

Similarly, when network receiver device 360 receives a network signal of a first voltage potential, network receiver device 360 converts the network signal to digital signals of a logical-zero followed by a logical-zero. When network receiver device 360 receives a network signal of a second voltage potential, network receiver device 360 converts the network signal to digital signals of a logical-zero followed by a logical-one. When network receiver device 360 receives a network signal of a third voltage potential, network receiver device 360 converts the network signal to digital signals of a logical-one followed by a logical-zero. When network receiver device 360 receives a network signal of a fourth voltage potential, network receiver device 360 converts the network signal to digital signals of a logical-one followed by a logical-one. In other embodiments, the network signals of a first voltage potential, a second voltage potential, a third voltage potential and a fourth voltage potential can correspond to other combinations of logical-zeros and logical-ones.

In this embodiment, network transmitter device 359 can also convert digital signals to a network signal of a fifth voltage potential and network receiver device 360 can also convert a network signal of a fifth voltage potential to digital signals. The fifth voltage potential can be 0 volts or any other voltage level not previously utilized. The network signal of a fifth voltage potential can be labeled as "J." In this embodiment, network transmitter device 359 transmits a network signal of a fifth voltage potential when network transmitter device 359 receives a sequence of digital signals corresponding to three network signals of the same voltage potential. The three network signals of the same voltage potential can be a "K" followed by a "K" followed by a "K" (e.g. 2 volts followed by 2 volts followed by 2 volts), a "L" followed by a "L" followed by a "L" (e.g. 1 volt followed by 1 volt followed by 1 volt), a "M" followed by a "M"

followed by a "M" (e.g. −1 volt followed by a −1 volt followed by −1 volt), or a "N" followed by a "N" followed by a "N" (e.g. −2 volts followed by −2 volts followed by −2 volts). Thus, the digital signals corresponding to three network signals of the same voltage potential can be 000000 (logical-zero followed by logical-zero followed by logical-zero followed by logical-zero followed by logical-zero followed by logical-zero), 010101 (logical-zero followed by logical-one followed by logical-zero followed by logical-one followed by logical-zero followed by logical-one), 101010 (logical-one followed by logical zero followed by logical-one followed by logical-zero followed by logical-one followed by logical-zero), or 111111 (logical-one followed by logical-one followed by logical-one followed by logical-one followed by logical-one followed by logical-one).

When network transmitter device 359 receives any of the combination of digital signals corresponding to three network signals of the same voltage potential, network transmitter device 359 transmits a network signal of a fifth voltage potential followed by a network signal of a first voltage potential, second voltage potential, third voltage potential or fourth voltage potential, followed by a network signal of a fifth voltage potential. The network signal of a first voltage potential, a second voltage potential, a third voltage potential or a fourth voltage potential is selected by network transmitter device 359 based on which network signal corresponds to the digital signals. For example, when network transmitter device 359 receives digital signals of 000000, network transmitter device 359 converts the digital signals to a network signal of a fifth voltage potential followed by a network signal of a first voltage potential followed by a network signal of a fifth voltage potential. When network transmitter device 359 receives digital signals of 010101, network transmitter device 359 converts the digital signals to a network signal of a fifth voltage potential followed by a network signal of a second voltage potential followed by a network signal of a fifth voltage potential. When network transmitter device 359 receives digital signals of 101010, network transmitter device 359 converts the digital signals to a network signal of a fifth voltage potential followed by a network signal of a third voltage potential followed by a network signal of a fifth voltage potential. When network transmitter device 359 receives digital signals of 111111, network transmitter device 359 converts the digital signals to a network signal of a fifth voltage potential followed by a network signal of a fourth voltage potential followed by a network signal of a fifth voltage potential.

By transmitting a network signal of a fifth potential when network transmitter device 359 receives any combination of digital signals corresponding to three network signals of the same voltage potential, network transmitter device 359 avoids the transmission of three network signals of the same voltage potential over the network. In avoiding the transmission of three network signals of the same voltage potential, network transmitter device 359 also avoids baseline wander associated with repeated transmission of network signals of the same voltage potential.

Conversely, network receiver device 360 can also transmit a sequence of digital signals corresponding to three network signals of the same voltage potential when network receiver device 360 receives a network signal of a fifth voltage potential followed by a network signal of a first voltage potential, a second voltage potential, a third voltage potential or a fourth voltage potential, followed by a network signal of a fifth voltage potential. As such, when network receiver device 360 receives a network signal of a fifth voltage potential followed by a network signal of a first voltage potential followed by a network signal of a fifth voltage potential, network receiver device 360 converts the network signals to digital signals of 000000. When network receiver device 360 receives a network signal of a fifth voltage potential followed by a network signal of a second voltage potential followed by a network signal of a fifth voltage potential, network receiver device 360 converts the network signals to digital signals of 010101. When network receiver device 360 receives a network signal of a fifth voltage potential followed by a network signal of a third voltage potential followed by a network signal of a fifth voltage potential, network receiver device 360 converts the network signals to digital signals of 101010. When network receiver device 360 receives a network signal of a first voltage potential followed by a network signal of a fourth voltage potential followed by a network signal of a fifth voltage potential, network receiver device 360 converts the network signals to digital signals of 111111.

Moreover, network transmitter device 359 can receive digital signals from the computer system corresponding to an End of Frame (EOF) designation. When network transmitter device 359 receives digital signals corresponding to the EOF designation, network transmitter device 359 converts the digital signals to a network signal of a fifth voltage potential followed by a network signal of a fifth voltage potential followed by a network signal of a fifth voltage potential and transmits the network signals over the first pair of network lines or the second pair of network lines. Similarly, network receiver device 360 can convert network signals to digital signals corresponding to an EOF designation. When network receiver device 360 receives a fifth voltage potential followed by a fifth voltage potential followed by a fifth voltage potential on either the third pair of network lines or the fourth pair of network line, network receiver device 360 converts the network signals to digital signals corresponding to an EOF designation. Network receiver device 360 transmits the digital signals to periphery device 362 for transmission to the computer system. The EOF designation allows a transmitting computer system to indicate the end of the transmit frame and allows a receiving computer system to identify the end of the transmit frame.

It will be appreciated that other conversion schemes can also be utilized. For example, when network transmitter device 359 receives digital signals corresponding to three network signals of the same voltage potential, network transmitter device 359 can convert the digital signals to a network signal of a fifth voltage potential followed by a network signal of a fifth voltage potential followed by a network signal of a first voltage potential, second voltage potential, third voltage potential or fourth voltage potential. Network transmitter device 359 can transmit the network signals over the first pair of network lines or the second pair of network lines. When network receiver device 360 receives the network signals, network receiver device 360 can convert the network signals to digital signals corresponding to three network signals of the same voltage potential. Network receiver device 360 can transmit the digital signals to periphery device 362 for transmission to the computer system.

Under a second alternative conversion scheme, when network transmitter device 359 receives digital signals corresponding to three network signals of the same voltage potential, network transmitter device 359 converts the digital signals to a network signal of a fifth voltage potential followed by a network signal of a first voltage potential, a second voltage potential, a third voltage potential or a fourth voltage potential, followed by a network signal of a first voltage potential, a second voltage potential, a third voltage potential or a fourth voltage potential. Network transmitter device 359 transmits the network signals over the first pair of network lines or the second pair of network lines. When network receiver device 360 receives the network signals, network receiver device 360 can convert the network signals to digital signals corresponding to three network signals of the same voltage potential. Network receiver device 360 can transmit the digital signals to periphery device 362 for transmission to the computer system.

Under a third alternative conversion scheme, when network transmitter device 359 receives digital signals corresponding to three network signals of the same voltage potential, network transmitter device 359 converts the digital signals to a network signal of a first voltage potential, a second voltage potential, a third voltage potential or a fourth voltage potential followed by a network signal of a fifth voltage potential followed by a network signal of a first voltage potential, a second voltage potential, a third voltage potential or a fourth voltage potential. Network transmitter device 360 transmits the network signals over the first pair of network lines or the second pair of network lines. When network receiver device 360 receives the network signals, network receiver device 360 converts the network signals to digital signals corresponding to three network signals of the same voltage potential. The digital signals are transmitted to periphery device 362 for transmission to the computer system.

Under a fourth alternative conversion scheme, when network transmitter device 359 receives digital signals corresponding to three network signals of the same voltage potential, network transmitter device 359 converts the network signals to a network signal of a first voltage potential, a second voltage potential, a third voltage potential or a fourth voltage potential, followed by a network signal of a first voltage potential, a second voltage potential, a third voltage potential or a fourth voltage potential, followed by a network signal of a fifth voltage potential. Network transmitter device 359 transmits the network signals over the first pair of network lines or the second pair of network lines. When network receiver device 360 receives the network signals, network receiver device 360 converts the network signals to digital signals corresponding to three network signals of the same voltage potential e.g. a first voltage potential, a second voltage potential, a third voltage potential or a fourth voltage potential. Network receiver device 360 transmits the digital signals to periphery device 362 for transmission to the computer system.

Figure 4:
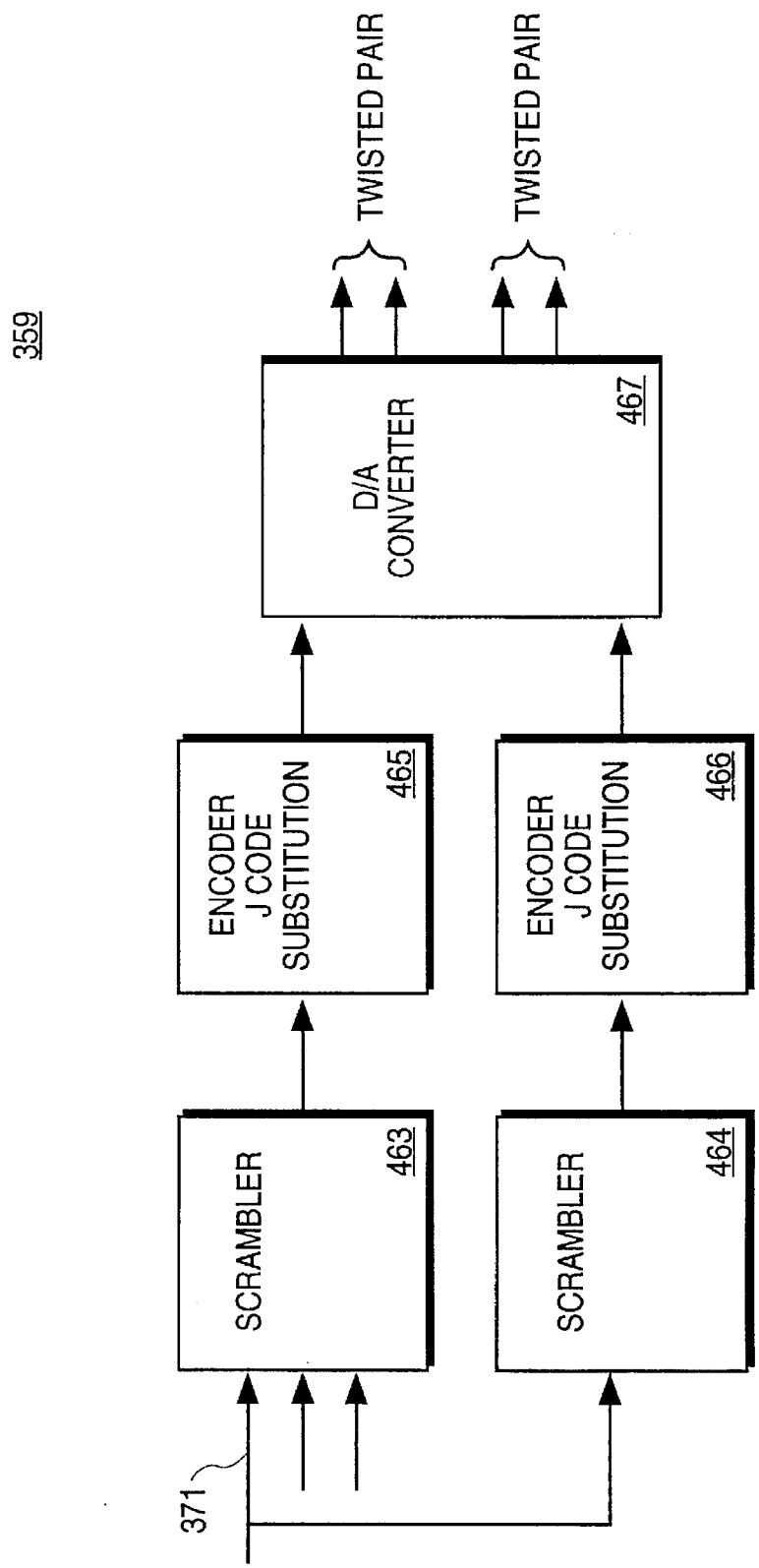
FIG. 4 illustrates in block diagram form a network transmitter device of a fourth embodiment of the present invention.

FIG. 4 illustrates in block diagram form a network transmitter device of a fourth embodiment of the present invention. Network transmitter device 359 can be an implementation of the network transmitter device of the third embodiment of the present invention. Network transmitter device 359 comprises scrambler device 463, scrambler device 464, encoder device 465, encoder 466 and converter device 467. Scrambler device 463 is coupled to the input of network transmitter device 359 and is also coupled to encoder device 465. Scrambler device 464 is coupled to the input of network transmitter device 359 and is also coupled to encoder device 466. Encoder device 465 and encoder device 466 are coupled to converter 467. Converter 467 is coupled to the first pair of network lines and the second pair of network lines. Scrambler device 463 receives two bits of digital signals at a time. Scrambler device 463 randomizes the digital signals in accordance with a randomizer algorithm. The randomization of the digital signals makes the transmission of the digital signals less periodic. This effect in turn serves to reduce the electromagnetic radiation attributed to the transmission of the digital signals. Scrambler device 463 outputs a randomized version of the digital signals as digital signals comprising three bits. Scrambler device 464 also receives two bits of digital signals from the input of network transmitter device 359. Thus, scrambler device 464 in conjunction with scrambler device 463 allows network transmitter device 359 to receive four bits of digital signals at a time. Scrambler device 464 operates similarly to scrambler device 463 and randomizes the two bits of digital signals. Scrambler device 464 outputs a randomized version of the digital signals as digital signals comprising three bits. The three bit digital signals correspond to the network signals as shown in Table 2.

TABLE 2

| 3 BIT DIGITAL SIGNALS | NETWORK SIGNAL | VOLTAGE POTENTIAL |
|---|---|---|
| 000 | K | 2 volts |
| 001 | L | 1 volt |
| 010 | M | −1 volt |
| 011 | N | −2 volts |
| 100 | J | 0 volts |

The three bit digital signals of 000 (logical-zero followed by logical-zero followed by logical-zero) corresponds to a network signal of a first voltage potential e.g. 2 volts. The three bit digital signals of 001 (logical-zero followed by logical-zero followed by logical-one) corresponds to a network signal of a second voltage potential e.g. 1 volt. The three bit digital signals of 010 (logical-zero followed by logical-one followed by logical-zero) corresponds to a network signal of a third voltage potential e.g. −1 volt. The three bit digital signals of 011 (logical-zero followed by logical-one followed by logical-one) corresponds to a network signal of a fourth voltage potential e.g. −2 volts. Scrambler device 463 transmits the three bit digital signals to encoder device 465 and scrambler device 464 transmits another set of three bit digital signals to encoder device 466. Encoder device 465 receives the three bit digital signals from scrambler device 463 and transmits the three bit digital signals to converter device 467. However, when encoder device 465 receives a sequence of three bit digital signals corresponding to three network signals of the same voltage potential, encoder device 465 transmits to converter device 467 a sequence of three bit digital signals corresponding to a network signal of fifth voltage potential followed by a network signal of a first voltage potential, second voltage potential, third voltage potential or fourth voltage potential, followed by a network signal of a fifth voltage potential.

The three bit digital signals corresponding to network signals of a first voltage potential, a second voltage potential, a third voltage potential and a fourth voltage potential is shown in Table 2. The three bit digital signals corresponding to a network signal of a fifth voltage potential is 100 (logical-one followed by logical-zero followed by logical-zero). Thus, when encoder device 465 receives a sequence of three bit digital signals of 000000000, encoder device 465 transmits a sequence of three bit digital signals of 100000100. When encoder device 465 receives a sequence of three bit digital signals comprising 001001001, encoder device 465 transmits a sequence of three bit digital signals comprising 100001100. When encoder device 465 receives a sequence of three bit digital signals comprising 010010010, encoder device 465 transmits a sequence of three bit digital signals comprising 100010100. When encoder device 465 receives a sequence of three bit digital signals comprising 011011011, encoder device 465 transmits a sequence of three bit digital signals comprising 100011100. Encoder device 466 operates similarly to encoder device 465 except that encoder device 466 receives three bit digital signals from scrambler device 464 instead of scrambler device 463. Encoder device 465 and encoder device 466 both transmit three bit digital signals to converter 467. Converter 467 receives three bit digital signals from encoder device 465 and encoder device 466. Converter device 467, converts the three bit digital signals into network signals of a specified voltage potential in accordance with Table 2. Converter device 467 then transmits to the first pair of network lines, the network signals corresponding to the three bit digital signals received from encoder device 465. Converter device 467 also transmits to the second pair of network lines the network signals corresponding to the three bit digital signals received from encoder device 466.

Figure 5:
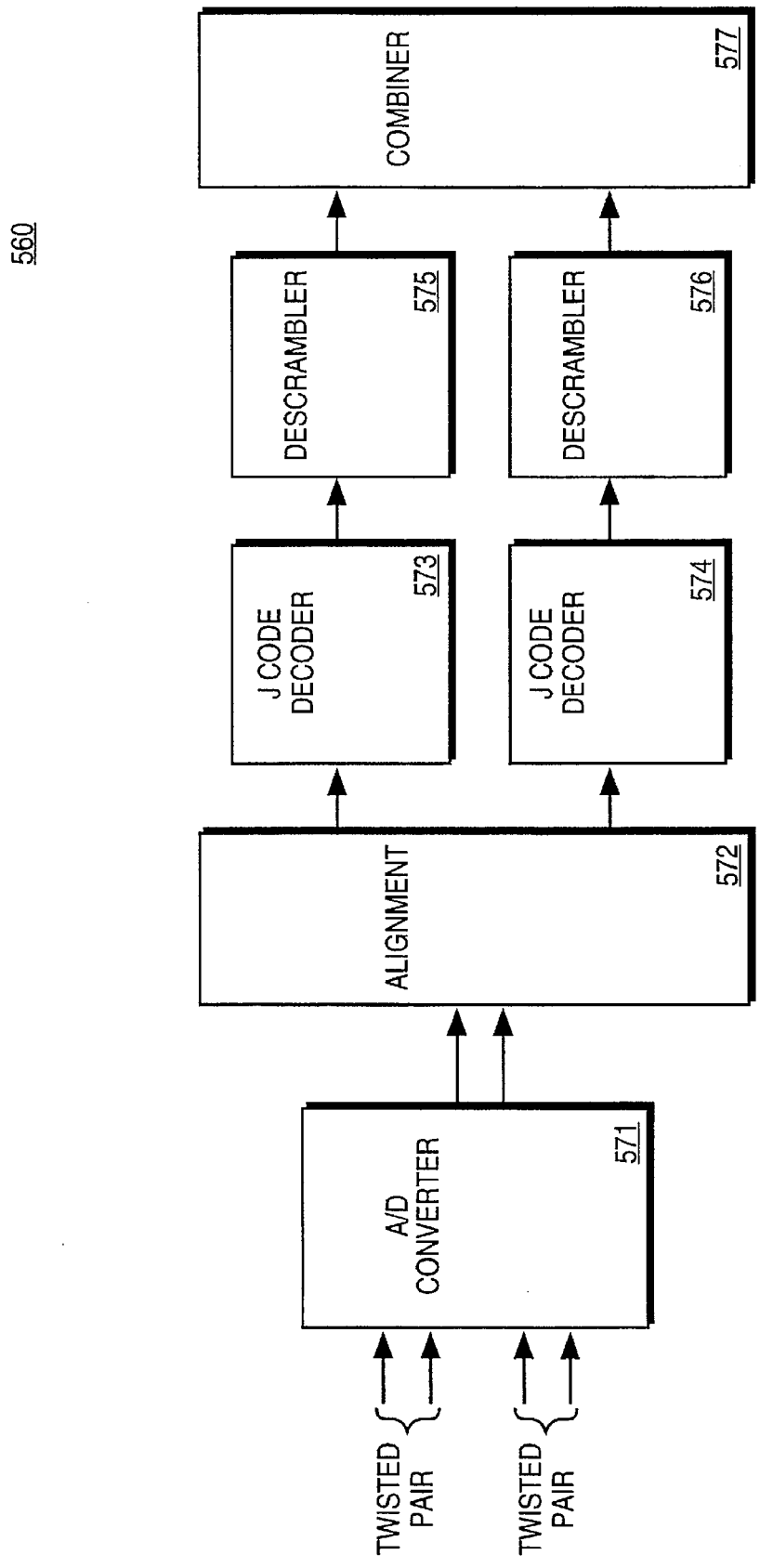
FIG. 5 illustrates in block diagram form a network receiver device of a fifth embodiment of the present invention.

FIG. 5 illustrates in block diagram form a network receiver device of a fifth embodiment of the present invention. Network receiver device 560 can be an implementation of the network receiver device of the third embodiment of the present invention. Network receiver device 560 comprises converter device 571, alignment device 572, decoder device 573, decoder device 574, descrambler device 575, descrambler device 576 and combiner device 577. Converter device 571 is coupled to alignment device 572. Alignment device 572 is coupled to decoder device 573 and is also coupled to decoder device 574. Decoder device 573 is coupled to descrambler device 575 and decoder device 574 is coupled to descrambler device 576. Descrambler device 575 and descrambler device 576 are both coupled to combiner device 577. Converter device 571 receives network signals over the third pair of network lines and the fourth pair of network lines. Converter device 571 converts the network signals to three bit digital signals in accordance with Table 2. Converter device 571 transmits to alignment device 572 one sequence of three bit digital signals corresponding to network signals received over the third pair of network lines. Converter device 571 also transmits to alignment device 572 another sequence of three bit digital signals corresponding to network signals received over the fourth pair of network lines.

Alignment device 572 aligns the two sequences of three bit digital signals with each other. Thus, alignment device 572 ensures that one sequence of three bit digital signals is in the proper phase relationship with the other sequence of three bit digital signals. Alignment device 572 transmits to decoder device 573 the aligned three bit digital signals corresponding to the network signals received over the third pair of network lines. Alignment device 572 also transmits to decoder device 574 the aligned three bit digital signals corresponding to the network signals received over the fourth pair of network lines.

Decoder device 573 receives aligned three bit digital signals from alignment device 572 and transmits the aligned three bit digital signals to descrambler device 575. However, when decoder device 573 receives a sequence of aligned three bit digital signals corresponding to a network signal of a fifth voltage potential followed by a network signal of a first voltage potential, a second voltage potential, a third voltage potential or a fourth voltage potential, followed by a network signal of a fifth voltage potential, decoder device 573 transmits a sequence of three bit digital signals corresponding to three network signals of the same voltage potential. For example, when decoder device 573 receives three bit digital signals comprising 100000100, decoder device 573 transmits three bit digital signals comprising 000000000. When decoder device 573 receives three bit digital signals comprising 100001100, decoder device 573 transmits three bit digital signals comprising 001001001 to descrambler device 575. When decoder device 573 receives three bit digital signals comprising 0100010100, decoder device 573 transmits three bit digital signals comprising 010010010 to descrambler device 575. When decoder device 573 receives three bit digital signals comprising 100011100, decoder device 573 transmits three bit digital signals comprising 011011011 to descrambler device 575. Decoder device 574 operates similarly to decoder device 573 except that decoder device 574 receives three bit digital signals corresponding to network signals received over the fourth pair of network lines and transmits the three bit digital signals to descrambler device 576.

Descrambler device 575 unrandomizes the three bit digital signals from decoder device 573 and transmits two bit digital signals corresponding to the three bit digital signals in accordance with Table 3. The two bit digital signals are truncated versions of the three bit digital signals with the first bit of the three bit digital signals truncated. Descrambler device 575 thus restores the original digital signals prior to randomization by scrambler device 463. The two bit digital signals from descrambler device 575 is transmitted to combiner device 577. Descrambler device 576 operates similarly to descrambler device 575 except that descrambler device 576 receives three bit digital signals from decoder device 574 and transmits two bit versions of the three bit digital signals to combiner device 577. Combiner device 577 receives the two bit digital signals from descrambler device 575 and the two bit digital signals from descrambler device 576 combining them to produce four bit digital signals. The four bit digital signals are transmitted at the same time over four separate lines to periphery device 362.

TABLE 3

| 2 BIT DIGITAL SIGNALS | 3 BIT DIGITAL SIGNALS |
| --- | --- |
| 00 | 000 |
| 01 | 001 |
| 10 | 010 |
| 11 | 011 |

Figure 6:
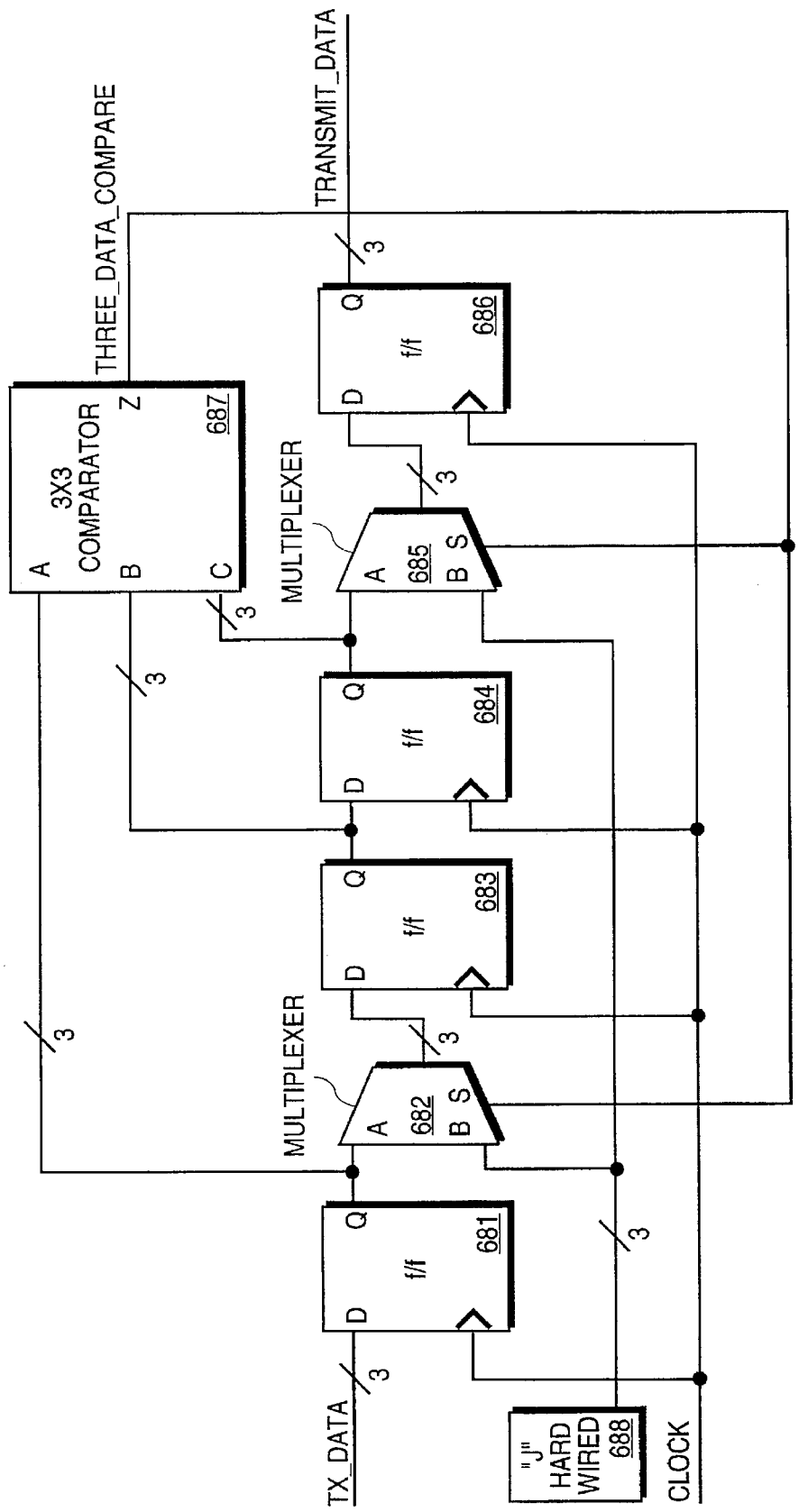
FIG. 6 illustrates in block diagram form an encoder device of a sixth embodiment of the present invention.

FIG. 6 illustrates in block diagram form an encoder device of a sixth embodiment of the present invention. Encoder device illustrated in FIG. 6 is an example of encoder device 465 and encoder device 466 of FIG. 4. Encoder device comprises D-type flip-flop 681, multiplexor 682, D-type flip-flop 683, D-type flip-flop 684, multiplexor 685, D-type flip-flop 686, comparator 687 and J code generator 688. The D terminal of D-type flip-flop 681 is coupled to the data input of encoder device 665. The clock terminal of D-type flip-flop 681 is coupled to the clock signal line. The Q terminal of D-type flip-flop 681 is coupled to the first input terminal of multiplexor 682 and is also coupled to the first input terminal of comparator device 687. The second input terminal of multiplexor 682 is coupled to J code generator 688. The output terminal of multiplexor 682 is coupled to the D terminal of D-type flip-flop 683. The clock terminal of D-type flip-flop 683 is coupled to the clock signal line. The Q terminal of D-type flip-flop 683 is coupled to the D terminal of D-type flip-flop 684 and is also coupled to the second input terminal of comparator device 687. The clock terminal of D-type flip-flop 684 is coupled to the clock signal line. The Q terminal of D-type flip-flop 684 is coupled to the first input terminal of multiplexor 685 and is also coupled to the third input terminal of comparator 687. The second input terminal of multiplexor 685 is coupled to J code generator 688. The output terminal of multiplexor 685 is coupled to the D terminal of D-type flip-flop 686. The Q terminal of D-type flip-flop 686 is coupled to the data output of encoder device 665. The output terminal of comparator device 687 is coupled to the select terminals of multiplexor 682 and multiplexor 685.

The data input of encoder device 665 is coupled to three lines and receives 3 bits of data at a time. D-type flip-flop 681, D-type flip-flop 683, D-type flip-flop 684, and D-type flip-flop 686 comprise three D-type flip-flops each and each stores 3 bits of data at a time. In addition, multiplexors 682 and 685 each comprise three 2-1 multiplexors. For ease of illustration, only one block is shown in FIG. 6 for each of D-type flip-flop 681, D-type flip-flop 683, D-type flip-flop 684, and D-type flip-flop 686. D-type flip-flop 681 latches the data on the data input of encoder device 665 during the rising edge of the clock signal and then transmits the data to multiplexor 682 from the Q terminal of D-type flip-flop 681.

Comparator device 687 compares the data signals on the Q terminal of D-type flip-flop 681 with the data signals on the Q terminal of D-type flip-flop 683 with the data signals on the Q terminal of D-type flip-flop 684. When the data signals on the three Q terminals match, comparator device 681 transmits a first signal from the output of comparator device 687 to the select terminal of multiplexor 682 and the select terminal of multiplexor 685. When the data signals on one Q terminal differs from another one of the three Q terminals, comparator device 687 transmits a second signal from the output of comparator device 687 to the select terminal of multiplexor 682 and the select terminal of multiplexor 685. When multiplexor 682 receives the second signal from comparator device 687, multiplexor 682 selects the first input terminal and transmits the data signals from the Q terminal of D-type flip-flop 681 to the D terminal of D-type flip-flop 683. On the other hand, when multiplexor 682 receives the first signal from comparator device 687, multiplexor 682 selects the second input terminal and transmits the data signals from J code generator 688 to the D terminal of D-type flip-flop 683. J code generator 688 is "hard wired" and comprises circuitry to generate digital signals corresponding to the J code (a network signal of the fifth voltage potential). The digital signals corresponding to the J code are 000.

On the second rising edge of the clock signal, D-type flip-flop 683 latches the first set of data signals from the Q terminal of D-type flip-flop 681 and then transmits the first set of data signals from the Q terminal of D-type flip-flop 683 to the D terminal of D-type flip-flop 684. Also during the second rising edge of the clock signal, D-type flip-flop 681 latches the second set of data signals from the data input of encoder device 665 and transmits the data signals from the Q terminal of D-type flip-flop 681 to multiplexor 682.

During the third rising edge of the clock signal, D-type flip-flop 684 latches the first set of data signals from the Q terminal of D-type flip-flop 683 and then transmits the first set of data signals from the Q terminal of D-type flip-flop 684 to the first input terminal of multiplexor 685. Also during the third rising edge of the clock signal, D-type flip-flop 683 latches the second set of data signals from multiplexor 682 and then transmits the second set of data signals from Q terminal of D-type flip-flop 683 to the D terminal of D-type flip-flop 684. Also during the third rising edge of the clock signal, D-type flip-flop 681 latches the third set of data signals from the data input of encoder device 665 and then transmits the third set of data signals from the Q terminal of D-type flip-flop 681 to multiplexor 682. Multiplexor 685 operates similarly to multiplexor 682 selecting the first input terminal in response to the first signal from comparator device 687 and selecting the second input terminal in response to the second signal from comparator device 687. Multiplexor 685 transmits the data signal on the Q terminal of D-type flip-flop 684 to the D terminal of D-type flip-flop 686 or transmits the data signals corresponding to the J code from J code generator 688 to the D terminal of D-type flip-flop 686.

During the fourth rising edge of the clock signal, D-type flip-flop 686 latches the first set of data signals from multiplexor 685 and then transmits the first set of data signals from the Q terminal of D-type flip-flop 686 to the data output of encoder device 665. Also during the fourth rising edge of the clock signal, D-type flip-flop 684 latches the second set of data signals from D-type flip-flop 683 and then transmits the second set of data signals to multiplexor 685. Also during the fourth rising edge of the clock signal, D-type flip-flop 683 latches the third set of data signals from multiplexor 682 and then transmits the third set of data signals to D-type flip-flop 684. Also during the fourth rising edge of the clock signal, D-type flip-flop 681 latches the fourth set of data signals and then transmits the fourth set of data signals to multiplexor 682. In this manner, data signals from the data input of encoder device 665 are transmitted through D-type flip-flop 681, D-type flip-flop 683, D-type flip-flop 684 and D-type flip-flop 686 to the data output of encoder device 665. Comparator device 687 compares the data signals latched by D-type flip-flop 681, D-type flip-flop 683 and D-type flip-flop 684. When the three sets of data signals match, comparator device 687 by transmitting the first signal causes multiplexor 682 to replace one set of data signals with data signals corresponding to the J code and causes multiplexor 685 to replace another set of data signals with data signals corresponding to the J code. One set of data signals remains intact and along with the two sets of data signals corresponding to the J code are transmitted through D-type flip-flop 686 to the data output of encoder device 665.

Figure 7:
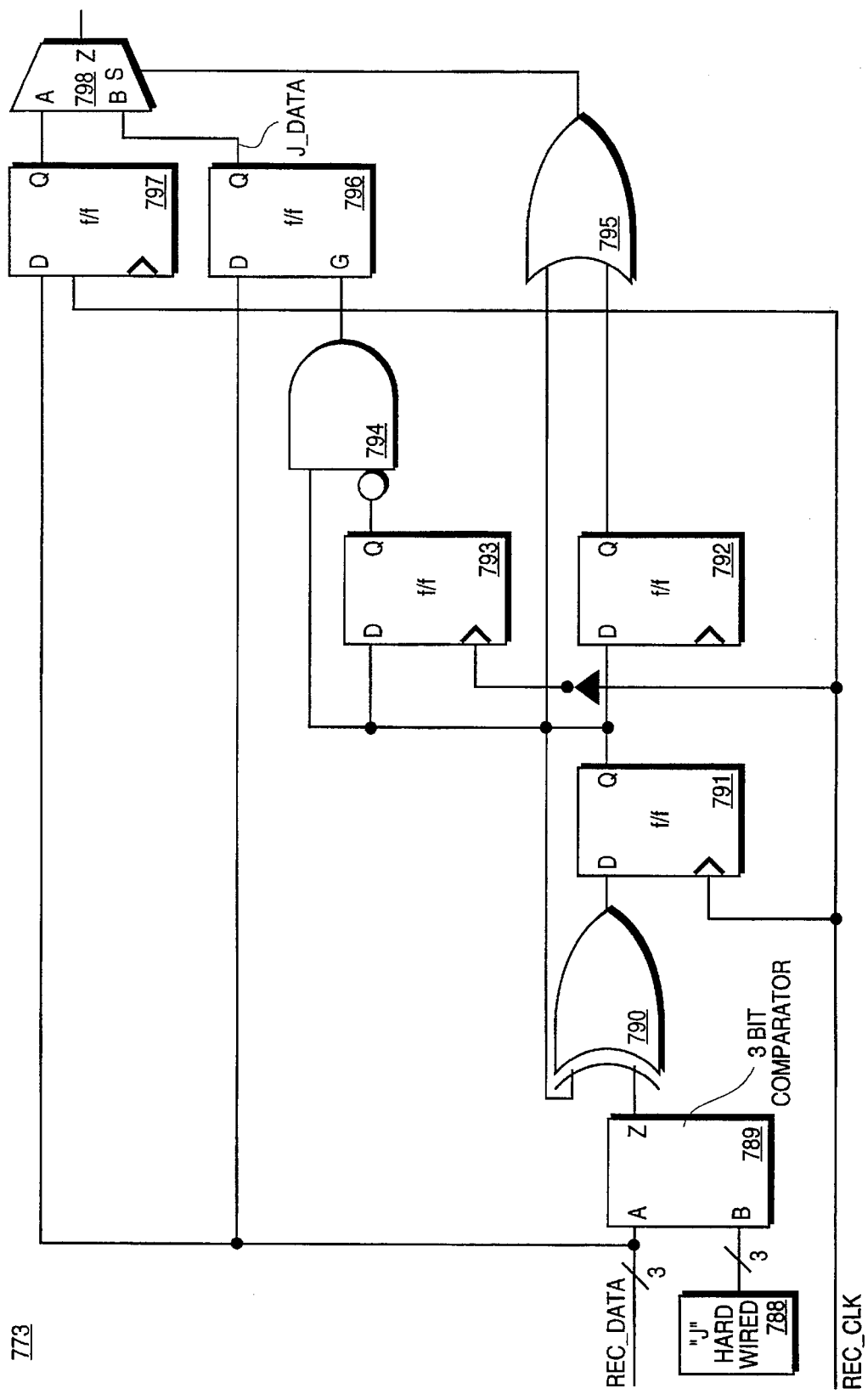
FIG. 7 illustrates in block diagram form a decoder device of a seventh embodiment of the present invention.

FIG. 7 illustrates in block diagram form a decoder device of a seventh embodiment of the present invention. Decoder device 773 comprises J code generator 788, comparator 789, XOR gate 790, D-type flip-flop 791, D-type flip-flop 792, D-type flip-flop 793, AND gate 794, OR gate 795, D-type flip-flop 796, D-type flip-flop 797 and multiplexor 798.

The first input terminal of comparator 789 is coupled to the data input of decoder device 773. The second input terminal of comparator 789 is coupled to J code generator 788. The output terminal of comparator 789 is coupled to the first input terminal of XOR gate 790. The second input terminal of XOR gate 790 is coupled to the Q terminal of D-type flip-flop 791. The output terminal of XOR gate 790 is coupled to the D terminal of D-type flip-flop 791. The clock terminal of D-type flip-flop 791 is coupled to the clock signal line. The Q terminal of D-type flip-flop 791 is also coupled to the D terminal of D-type flip-flop 792, the D terminal of D-type flip-flop 793, the first input terminal of AND gate 794 and the first input terminal of OR gate 795. The Q terminal of D-type flip-flop 792 is coupled to the second input terminal of OR gate 795. The clock terminal of D-type flip-flop 792 is coupled to the clock signal line. The Q terminal of D-type flip-flop 793 is coupled to the inverted second input of AND gate 794. The clock terminal of D-type flip-flop 793 is coupled to the inversion of the clock signal. The output of AND gate 794 is coupled to the clock terminal of D-type flip-flop 796. The output terminal of OR gate 795 is coupled to the select terminal of multiplexor 798. The D terminal of D-type flip-flop 796 is coupled to the data input of decoder device 773. The Q terminal of D-type flip-flop 796 is coupled to the second input terminal of multiplexor 798. The D terminal D-type flip-flop 797 is coupled to the data input of decoder device 773. The Q terminal of D-type flip-flop 797 is coupled to the first input terminal of multiplexor 798. The clock terminal of D-type flip-flop 797 is coupled to the clock signal line. The output of multiplexor 798 is coupled to the output of decoder device 773.

J code generator 788 is "hard wired" and comprises circuitry to generate digital signals corresponding to the J code (a network signal of the fifth voltage potential). The digital signals corresponding to the J code are 000. Comparator device 789 compares the data signals on the data input of decoder device 773 with the digital signals corresponding to the J code generated by J code generator 788. When the data signals on the data input of decoder device 773 match the digital signals corresponding to the J code generated by J code generator 788, comparator device 789 transmits a first signal from the output of comparator device 789 to the first input terminal of XOR gate 790. When the data signal on the data input of decoder device 773 differs from the digital signals corresponding to the J code, comparator device 789 transmits a second signal from the output of comparator device 789 to the first input terminal of XOR gate 790.

XOR gate 790 exclusive-ORs the signal from the output terminal of comparator 789 with the signal from the Q terminal of D-type flip-flop 791. XOR gate 790 outputs a first signal when the signals on the two input terminals of XOR gate 790 are different. When the signals on the two input terminals of XOR gate 790 are the same, XOR gate 790 outputs a second signal. When decoder device 773 receives, through the data input, digital signals corresponding to a network signal of the fifth voltage potential (J code), followed by a network signal of a first, second, third or fourth voltage potential, followed by a network signal of the fifth voltage potential, XOR gate 790 outputs the first signal shortly after the digital signals corresponding to the J code are received by decoder device 773. XOR gate 790 continues to output the first signal while decoder device 773 receives a network signal of a first, second, third or fourth voltage potential. XOR gate 790 outputs the second signal shortly after the next set of digital signals corresponding to the J code is received by decoder device 773.

D-type flip-flop 791 latches the output signal of XOR gate 790 at the rising edge of the clock signal. In this case, where the transitions in the output signal of XOR gate 790 occur shortly after the rising edge of the clock signal, D-type flip-flop 791 outputs on the Q terminal an output signal that is a delayed version of the output signal from XOR gate 790. The delay is approximately one clock period.

D-type flip-flop 792 latches the output signal on the Q terminal of D-type flip-flop 791 during the rising edge of the clock signal. In this case, where the transitions in the output signal of XOR gate 790 occur shortly after the rising edge of the clock signal and thus the transitions in the output signal of D-type flip-flop 791 occur shortly after the rising edge of the clock signal, D-type flip-flop 792 outputs a delayed version of the output signal from D-type flip-flop 791. The delay is approximately one clock period.

OR gate 795 performs an OR operation on the output signal at the Q terminal of D-type flip-flop 791 with the output signal at the Q terminal of D-type flip-flop 792. When either flip-flop outputs a first signal, OR gate 795 also outputs a first signal. Thus, in this example, OR gate 795 outputs the first signal approximately one clock period after the digital signals corresponding to the first J code is received by decoder device 773. OR gate 795 continues to output the first signal for approximately three clock periods and then outputs the second signal. In this manner, OR gate 795 outputs the first signal for the duration of the digital signals corresponding to the first J code, the digital signals corresponding to the network signal between the J code, and the digital signals corresponding to the second J code. The output of OR gate 795 is provided to the select terminal of multiplexor 798.

Multiplexor 798 selects the output of D-type flip-flop 796 when OR gate 795 outputs the first signal. When OR gate 795 outputs the second signal, multiplexor 798 selects the output of D-type flip-flop 797. In this example, multiplexor 798 selects the output of D-type flip-flop 796 approximately one clock period after decoder device 773 receives the digital signals corresponding to the J code and continues to select the output of D-type flip-flop 796 for approximately three clock periods.

D-type flip-flop 793 latches the output signal at the Q terminal of D-type flip-flop 791 during the falling edge of the clock signal. In this case, where the transitions in the output signal of XOR gate 790 occur shortly after the rising edge of the clock signal and thus the transitions in the output signal of D-type flip-flop 791 occur shortly after the rising edge of the clock signal, D-type flip-flop 792 outputs a delayed version of the output signal from D-type flip-flop 791. The delay is approximately one-half clock period.

AND gate 794 performs an AND operation on the output signal at the Q terminal of D-type flip-flop 791 with the inversion of the output signal at the Q terminal of D-type flip-flop 793. When D-type flip-flop 791 outputs a first signal and D-type flip-flop 793 outputs a second signal, AND gate 794 outputs a first signal. When D-type flip-flop 791 outputs a second signal or D-type flip-flop 793 outputs a first signal, AND gate 794 outputs a second signal. Thus, in this example, AND gate 794 outputs the first signal approximately one clock period after the digital signals corresponding to the first J code is received by decoder device 773. AND gate 794 continues to output the first signal for approximately one-half clock period and then outputs the second signal. In this manner, AND gate 794 outputs the first signal for an approximate duration of one-half clock cycle when decoder device 773 receives digital signals corresponding to a network signal of a first voltage potential, a second voltage potential, a third voltage potential or a fourth voltage potential.

D-type flip-flop 796 latches the input signal received by decoder device 773 when AND gate 794 outputs the first signal. In this case, where AND gate 794 outputs the first signal for an approximate duration of one-half clock cycle when decoder device 773 receives digital signals corresponding to a network signal of a first voltage potential, a second voltage potential, a third voltage potential or a fourth voltage potential, D-type flip-flop 796 latches the digital signals corresponding to a network signal of a first voltage potential, a second voltage potential, a third voltage potential or a fourth voltage potential.

D-type flip-flop 797 latches the input signal received by decoder device 773 during the rising edge of the clock signal. In this manner, D-type flip-flop 797 provides a synchronized version of the input signal to multiplexor 798.

Figure 8:
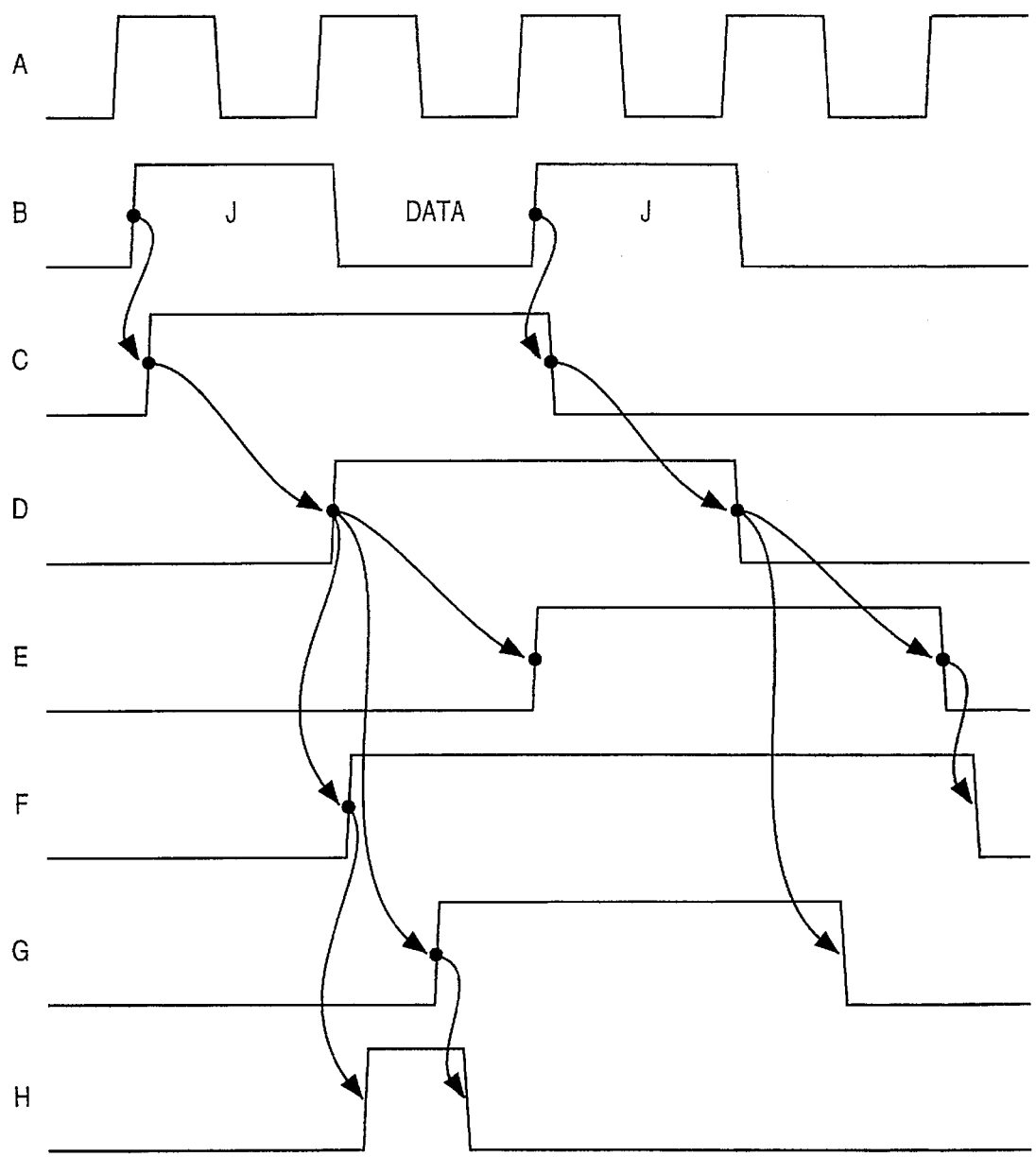
FIG. 8 illustrates in timing diagram form the operation of the decoder of FIG. 7.

FIG. 8 illustrates in timing diagram form the operation of the decoder of FIG. 7. Waveforms A, B, C, D, E, F, G and H respectively represent the signals on the clock signal line, output terminal of comparator 789, output terminal of XOR gate 790, Q terminal of D-type flip-flop 791, Q terminal of D-type flip-flop 792, OR gate 795, Q terminal of D-type flip-flop 793, and AND gate 794. The data signals received by decoder 773 transitions shortly after the rising edge of the clock signal. Thus, the output signal transmitted by comparator 789 transitions near the rising edge of the clock signal and waveform B transitions near the rising edge of the clock signal. Waveform B begins in the logical-zero state. When decoder device 773 receives digital signals corresponding to the J code, waveform B transitions to the logical-one state. When decoder device 773 receives data signals corresponding to a network signal of a first, second, third, or fourth voltage potential, waveform B transitions to the logical-zero state. When decoder device 773 receives digital signals corresponding to the J code, waveform B transitions to the logical-one state. When decoder device 773 receives no signals, waveform B transitions back to the logical-zero state.

Waveform C begins in the logical-zero state and transitions to the logical-one state shortly after waveform B transitions to the logical-one state. Waveform C remains in the logical-one state when waveform B transitions to the logical-zero state. When waveform B transitions back to the logical-one state, waveform C transitions to the logical-zero state shortly after the transition in waveform B.

Waveform D is a delayed version of waveform C with transitions occurring shortly after the rising edge of the clock signal. The delay is approximately one clock period. Similarly, waveform E is a delayed version of waveform D with transitions occurring shortly after the rising edge of the clock signal. The delay is approximately one clock period.

Waveform F begins in the logical-zero state. When waveform D transitions to the logical-one state, waveform F transitions to the logical-one state shortly after the transition in waveform D. Waveform F remains in the logical-one state until both waveform D and waveform E transition back to the logical-zero state.

Waveform G is a delayed version of waveform D with the transitions occurring shortly after the falling edge of the clock signal. The delay is approximately one-half clock period.

Waveform H begins in the logical-zero state. When waveform D transitions to the logical-one state, waveform H transitions to the logical-one state. Waveform H remains in the logical-one state until waveform G transitions to the logical-one state. When the transition in waveform G occurs, waveform H transitions back to the logical-zero state.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, methods and apparatuses for transmitting signals over a network and for receiving signals over a network have been described.

What is claimed is:

1. A system for communicating data between a plurality of computers that are connected together by four twisted pair, said system comprising:

a periphery device connected to each of said plurality of computers and receiving data signals therefrom;

a transmitter connected to said periphery device and to a first and second of said twisted pair, wherein said first twisted pair and said second twisted pair are dedicated exclusively to said transmitter; said transmitter receiving digital data from said periphery device, converting said digital data to network signals having four voltage levels and transmitting a portion of said network signals over said first twisted pair and the remainder over said second twisted pair;

a receiver connected to said periphery device and to a third and fourth twisted pair, wherein said third twisted pair and said fourth twisted pair are dedicated exclusively to said transmitter; said receiver receiving network signals from said third and fourth twisted pair, converting said network signals to digital data and transferring said digital data to said computer.

2. The system of claim 1 wherein said transmitter comprises:

a first transmitter channel for processing a portion of said digital data received from said periphery device and which includes a first scrambler for randomizing said digital data;

a second transmitter channel for processing the remainder of said digital data received from said periphery device and having a second scrambler for randomizing said digital data; and a digital to analog converter for converting said digital data and control signals to network signals having four voltage potentials.

3. A system for communicating data between a plurality of computers that are connected together by four twisted pair, said system comprising:

a periphery device connected to each of said plurality of computers and receiving data signals therefrom;

a transmitter connected to said periphery device and to a first and second of said twisted pair, wherein said first twisted pair and said second twisted pari are dedicated exclusively to said transmitter; said transmitter receiving digital data from said periphery device, converting said digital data to network signals having four voltage levels and transmitting a portion of said network signals over said first twisted pair and the remainder over said second twisted pair;

a receiver connected to said periphery device and to a third and fourth twisted pair, said receiver comprising;

an analog to digital converter for converting said network signals to digital data and control signals;

an alignment device connected to said analog to digital converter for adjusting the phase relationship of said digital signals;

a first receiver channel connected to said alignment device for processing a portion of said digital data received from said analog to digital converter and which includes a first descrambler for unrandomizing said digital data;

a second receiver channel connected to said alignment device for processing the remainder of said digital data received from said periphery device and having a second descrambler for unrandomizing said digital data; and a combiner connected to the output of said first and second channels for combining the output from said first and second receiver channels.

4. A system for communicating data between a plurality of computers that are connected together by four twisted pair, said system comprising:

a periphery device connected to each of said plurality of computers and receiving data signals therefrom;

a transmitter connected to said periphery device and to a first and second of said twisted pair, wherein said first twisted pair and said second twisted pair are dedicated exclusively to said transmitter; said transmitter receiving digital data from said periphery device, converting said digital data to network signals having five voltage levels and transmitting a portion of said network signals over said first twisted pair and the remainder over said second twisted pair;

a receiver connected to said periphery device and to a third and fourth twisted pair, wherein said third twisted pair and said fourth twisted pair are dedicated exclusively to said receiver, said receiver receiving network signals from said third and fourth twisted pair, converting said network signals to digital data and transferring said digital data to said computer.

5. The system of claim 4 wherein said transmitter comprises:

a first transmitter channel for processing a portion of said digital data received from said periphery device and which includes a first scrambler for randomizing said digital data and a first encoder for encoding said digital data;

a second transmitter channel for processing the remainder of said digital data received from said periphery device and having a second scrambler for randomizing said digital data and a second encoder for encoding said digital data; and a digital to analog converter for converting said digital data and control signals to network signals having four voltage potentials.

6. A system for communicating data between a plurality of computers that are connected together by four sets of twisted pair, said system comprising:

a periphery device connected to one of said plurality of computers and receiving data signals therefrom;

a transmitter connected to said periphery device and to a first two of said four sets of twisted pair; said transmitter receiving digital data from said periphery device, converting said digital data to network signals having five voltage levels and transmitting a portion of said network signals over one of said first two sets of twisted pairs and the remainder over the second of said first two sets of twisted pair;

a receiver connected to said periphery device and to a second two of said four sets of twisted pair; said receiver comprising:

an analog to digital converter for converting said network signals to digital data and control signals;

an alignment device connected to said analog to digital converter for adjusting the phase relationship of said digital signals;

a first receiver channel connected to said alignment device for processing a portion of said digital data received from said analog to digital converter and which includes a first descrambler for unrandomizing said digital data and a first decoder for decoding said digital data;

a second receiver channel connected to said alignment device for processing the remainder of said digital data received from said periphery device and having a second descrambler for unrandomizing said digital data and a second decoder for decoding said digital data; and a combiner connected to the output of said first and second channels for combining the output from said first and second receiver channels.

7. The system of claim 6 wherein said transmitter comprises:

a first transmitter channel for processing a portion of said digital data received from said periphery device and which includes a first scrambler for randomizing said digital data;

a second transmitter channel for processing the remainder of said digital data received from said periphery device and having a second scrambler for randomizing said digital data;

a digital to analog converter for converting said digital data and control signals to network signals having four voltage potentials; and wherein said first and second encoders further include:
means for detecting combinations of digital signals corresponding to three network signals of the same voltage potential; and
means for sending a network signal of the fifth voltage potential followed by one network signal of the same voltage potential as the detected three network signals followed by a network signal of the fifth voltage potential.

8. The system of claim 7 wherein said means for detecting combinations of digital signals corresponding to three network signals of the same voltage potential and means for sending a network signal of the fifth voltage potential followed by one network signal of the same voltage potential as the detected three network signals followed by a network signal of the fifth voltage potential comprises:

a first delay device having a signal input, a clock input and an output;

a second delay device having a signal input, a clock input and an output;

a third delay device having a signal input, a clock input and an output, said third delay device having its signal input connected to the output of said second delay device;

a fourth delay device having a signal input, a clock input and an output;

a first multiplexer having an A, B and select input, and an output, said A input connected to the output of said first delay device and its output connected to said second delay devices;

a second multiplexer having an A, B and select input, and an output, said A input connected to the output of said third delay device and its output connected to the signal input of said fourth delay device;

a comparator having an input connected to the output of said first, second and third delay device and its output connected to the select input of said first and second multiplexers, said comparator generating an output signal when all three signals on its inputs are the same; and a fifth voltage potential generator having its output connected to said B inputs of said first and second multiplexers.

9. The system of claim 6 wherein said first and second decoders transmit a sequence of digital signals corresponding to three network signals of the same voltage potential when said receiver receives a first network signal of a fifth voltage potential, a second network signal, and a third network signal of a fifth voltage potential.

10. The system of claim 8 wherein said first, second, third and fourth delay devices are D-type flip-flops.

11. A method for transmitting signals in a network comprising:

a receiving digital signals;

converting a first plurality of said digital signals to network signals of a first voltage potential a second voltage potential, a third voltage potential and a fourth voltage potential;

transmitting a first plurality of said network signals over a first pair of network lines;

transmitting a second plurality of said network signals over a second pair of network lines;

converting a second plurality of said digital signals to a network signal of a fifth voltage when said received digital signals contains a sequence that corresponds to three network signals of a same voltage potential.

12. The method of claim 11 further including:

receiving a network signal of a first voltage potential from said network;

converting said network signal of a first voltage potential to a first plurality of digital signals corresponding to said network signal of a first voltage potential;

transmitting said first plurality of digital signals to a computer system;

receiving a network signal of a second voltage potential from said network;

converting said network signal of a second voltage potential to a second plurality of digital signals corresponding to said network signal of a second voltage potential;

transmitting said second plurality of digital signals to said computer system;

receiving a network signal of a third voltage potential from said network;

converting said network signal of a third voltage potential to a third plurality of digital signals corresponding to said network signal of a third voltage potential;

transmitting said third plurality of digital signals to said computer system;

receiving a network signal of a fourth voltage potential from said network;

converting said network signal of a fourth voltage potential to a fourth plurality of digital signals corresponding to said network signal of a fourth voltage potential;

transmitting said fourth plurality of digital signals to said computer system;

receiving a network signal of a fifth voltage potential from said network;

converting said network signal of a fifth voltage potential to a predetermined sequence of digital signals.

* * * * *